US012688662B2

(12) United States Patent
Liu

(10) Patent No.: US 12,688,662 B2
(45) Date of Patent: Jul. 21, 2026

(54) DISPLAY METHOD, APPARATUS, ELECTRONIC DEVICE AND STORAGE MEDIUM FOR A VIRTUAL INPUT DEVICE

(71) Applicant: Beijing Zitiao Network Technology Co., Ltd., Beijing (CN)

(72) Inventor: Chin-Wei Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 171 days.

(21) Appl. No.: 18/468,063

(22) Filed: Sep. 15, 2023

(65) Prior Publication Data

US 2024/0096043 A1        Mar. 21, 2024

(30) Foreign Application Priority Data

Sep. 21, 2022    (CN) .......................... 202211154128.4

(51) Int. Cl.
*G06T 19/00*        (2011.01)
*G06F 3/01*        (2006.01)
*G06T 19/20*        (2011.01)
*G06V 10/74*        (2022.01)

(52) U.S. Cl.
CPC .............. *G06T 19/20* (2013.01); *G06F 3/017* (2013.01); *G06V 10/761* (2022.01); *G06T 2219/2012* (2013.01); *G06T 2219/2016* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 10,852,814 | B1 * | 12/2020 | Caron ................... | G06T 19/006 |
| 2002/0021287 | A1 * | 2/2002 | Tomasi ............... | G06F 3/04886 |
| | | | | 345/173 |
| 2002/0060669 | A1 * | 5/2002 | Sze ........................ | G06F 3/0426 |
| | | | | 345/173 |
| 2004/0095311 | A1 * | 5/2004 | Tarlton ................... | G06F 3/016 |
| | | | | 345/157 |
| 2010/0103103 | A1 * | 4/2010 | Palanker ............... | G06F 3/0425 |
| | | | | 345/158 |

(Continued)

FOREIGN PATENT DOCUMENTS

| | | |
|---|---|---|
| CN | 107168541 A | 9/2017 |
| CN | 108153428 A | 6/2018 |

(Continued)

OTHER PUBLICATIONS

Office Action received for Chinese Patent Application No. 202211154128.4, mailed on Apr. 20, 2026, 18 pages (9 pages of English Translation and 9 pages of Original Document).

*Primary Examiner* — Martin Mushambo
(74) *Attorney, Agent, or Firm* — Astute IP Law Group

(57)        ABSTRACT

The present disclosure relates to a display method, apparatus, electronic device, and storage medium for a virtual input device, which are suitable to an extended reality device. The method comprises: acquiring at least one object in the environment where a user is currently located; determining a target object from the at least one object; and displaying a virtual input device in an extended reality space, the virtual input device being attached to the target object.

19 Claims, 3 Drawing Sheets

(56)  References Cited

U.S. PATENT DOCUMENTS

| | | | | |
|---|---|---|---|---|
| 2010/0302155 A1* | 12/2010 | Sands | G06F 3/04886 | |
| | | | | 345/173 |
| 2011/0118753 A1* | 5/2011 | Itkowitz | A61B 34/74 | |
| | | | | 606/130 |
| 2011/0148670 A1* | 6/2011 | Sim | G06F 3/0233 | |
| | | | | 341/22 |
| 2012/0249741 A1* | 10/2012 | Maciocci | G06T 19/006 | |
| | | | | 348/51 |
| 2013/0257751 A1* | 10/2013 | Stafford | G06F 3/011 | |
| | | | | 345/173 |
| 2014/0282223 A1* | 9/2014 | Bastien | G06F 3/0485 | |
| | | | | 715/784 |
| 2015/0186037 A1* | 7/2015 | Kanatani | G06F 3/04883 | |
| | | | | 715/773 |
| 2016/0179336 A1* | 6/2016 | Ambrus | G02B 27/017 | |
| | | | | 715/768 |
| 2018/0082482 A1* | 3/2018 | Motta | G02B 27/0093 | |
| 2018/0284982 A1 | 10/2018 | Veeramani et al. | | |
| 2018/0322701 A1* | 11/2018 | Pahud | G06F 3/038 | |
| 2019/0018479 A1* | 1/2019 | Minami | G06F 3/013 | |
| 2019/0221044 A1* | 7/2019 | Motta | G06F 3/012 | |
| 2021/0209853 A1* | 7/2021 | Min | G06T 19/006 | |
| 2022/0083197 A1* | 3/2022 | Rockel | G06T 19/006 | |
| 2022/0409301 A1* | 12/2022 | Liu | A61B 34/32 | |
| 2023/0138952 A1* | 5/2023 | Klein | G06T 7/70 | |
| | | | | 345/633 |

FOREIGN PATENT DOCUMENTS

| | | |
|---|---|---|
| CN | 109683667 A | 4/2019 |
| JP | 2002-318652 A | 10/2002 |
| JP | 2003-076495 A | 3/2003 |
| JP | 2013-041431 A | 2/2013 |

* cited by examiner

Acquire at least one object in the environment where a user is current located /S110

Determine a target object from the at least one object /S120

Display a virtual input device in an extended reality space, the virtual input device being attached to the target object /S130

510             520             530

Acquisition module     Determination the module     Display module

DISPLAY METHOD, APPARATUS, ELECTRONIC DEVICE AND STORAGE MEDIUM FOR A VIRTUAL INPUT DEVICE

TECHNICAL FIELD

The present application is based on and claims priority of China Application No. 202211154128.4, filed on Sep. 21, 2022, the disclosure of which is incorporated by reference herein in its entirety.

The present disclosure relates to the field of extended reality technology, and in particular, to a display method, apparatus, electronic device and storage medium for a virtual input device.

BACKGROUND

Extended Reality (XR for short) refers to the combination of reality and virtuality through computers to create a virtual environment in which humans and computers may interact with. This is also a general term for various technologies such as AR, VR, and MR. Extended reality brings the "immersion" feeling of seamless transition between the virtual world and the real world to the experiencer.

SUMMARY

The present disclosure provides a display method, apparatus, electronic device and storage medium for a virtual input device.

In a first aspect, the present disclosure provides a display method for a virtual input device, which is suitable for an extended reality device, comprising:

acquiring at least one object in the environment where a user is currently located;

determining a target object from the at least one object;

displaying a virtual input device in an extended reality space, the virtual input device being attached to the target object.

In a second aspect, the present disclosure further provides a display apparatus for a virtual input device, which is suitable for an extended reality device, comprising:

an acquisition module configured to acquire at least one object in the environment where a user is currently located;

a determination module configured to determine a target object from the at least one object;

a display module configured to display a virtual input device in an extended reality space, the extended reality space being attached to the target object.

In a third aspect, the present disclosure further provides an electronic device, the electronic device comprising:

one or more processors;

a storage for storing one or more programs;

when executed by the one or more processors, the one or more programs cause the one or more processors to implement the display method for the virtual input device as described above.

In a fourth aspect, the present disclosure further provides a computer-readable storage medium having a computer program stored thereon, which, when executed by a processor, implement the display method for a virtual input device as described above.

The technical solutions provided by embodiments of the present disclosure are arranged to acquire at least one object in the environment where a user is currently located; determine a target object from the at least one object; and display a virtual input device in an extended reality space, the virtual input device being attached to the target object

BRIEF DESCRIPTION OF THE DRAWINGS

The accompanying drawings incorporated in and constituting a part of this specification illustrate embodiments consistent with the disclosure and serve to explain the principles of the disclosure along with the description.

In order to more clearly illustrate the technical solutions in the embodiments of the present disclosure or the related art, the following will briefly introduce the drawings that need to be used in the description of the embodiments or the related art. Apparently, for those of ordinary skill in the art, other drawings can also be obtained from these drawings without making creative labour.

DETAILED DESCRIPTION

In order to more clearly understand the above objectives, features and advantages of the present disclosure, the solutions of the present disclosure will be further described below. It should be noted that, the embodiments of the present disclosure and the features in the embodiments can be combined with each other in case of no conflict.

In the following description, many specific details are set forth in order to fully understand the present disclosure, but the present disclosure can also be implemented in other ways than described here; apparently, the embodiments in the description are only part of the embodiments of the present disclosure, and not all of the embodiments.

Extended Reality (XR for short) refers to the combination of reality and virtuality through computers to create a virtual environment in which humans and computers may interact with. This is also a general term for various technologies such as AR, VR, and MR. By integrating visual interaction technologies of the three, it brings the "immersion" feeling of seamless transition between the virtual world and the real world to the experiencer.

Extended reality terminal devices are terminals that can realize extended reality effects, and may usually be provided in the form of glasses, Head Mount Displays (HMD), and contact lenses for visual perception and other forms of perception. Of course, the forms of virtual reality device implementations are not limited to these, and may be further downsized or upsized as necessary.

Extended reality terminal devices can create virtual scenes. A virtual scene is a virtual scene displayed (or provided) when an application program runs on an electronic device. The virtual scene can be a simulated environment to the real world, a semi-simulation and semi-fictional virtual scene, or a purely fictitious virtual scene. The virtual scene may be any one of a two-dimensional virtual scene, a 2.5-dimensional virtual scene, or a three-dimensional virtual scene, and the embodiments of the present application does not have limitations on the dimension of the virtual scene.

Figure 1:
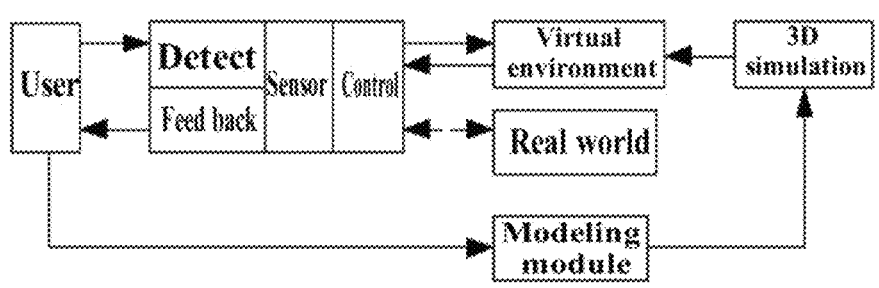
FIG. 1 is a structural block diagram of an extended reality terminal device provided by an embodiment of the present disclosure.

FIG. 1 is a structural block diagram of an extended reality terminal device provided by an embodiment of the present disclosure. Referring to FIG. 1, exemplarily, the extended reality terminal device is a Head Mount Display (HMD). Its main functional modules may include but not limited to the following components: 1) detection (module): to use various sensors to detect operation commands of a user, and act on the virtual environment, such as following the line of sight of the user to continuously update the image displayed on the display screen, realize interactions between the user and the virtual scene, such as continuously updating the real content based on the detected rotation direction of the user's head; 2) feedback (module): to receive data from the sensors and provide real-time feedback to the user; 3) sensors: one the one hand, to accept operation commands from the user and acts them on the virtual environment; on the other hand, to provide results generated upon operations to the user in various forms of feedbacks; 4) control module: to control the sensors and various input/output apparatus, including obtaining user data (such as actions, voices) and outputting sensory data, such as images, vibrations, temperatures, and sounds, and to have effects on the user, the virtual environment, and the real world; and 5) modelling module: to construct a three dimension model of the virtual environment, may also include various feedback mechanisms such as sound and touch in the three dimension model.

In the virtual reality scene, selecting a target object by a user can be realized through a controller, which can be a handle, and the user selects the target object by operating on a button of the handle. Of course, in other embodiments, gestures or voices may be used as well instead of controllers to control the target object in the extended reality terminal device. Wherein, the target object is an interactive object in the virtual scene, which is controlled by the user or a robot program (for example, a robot program based on artificial intelligence).

Figure 2:
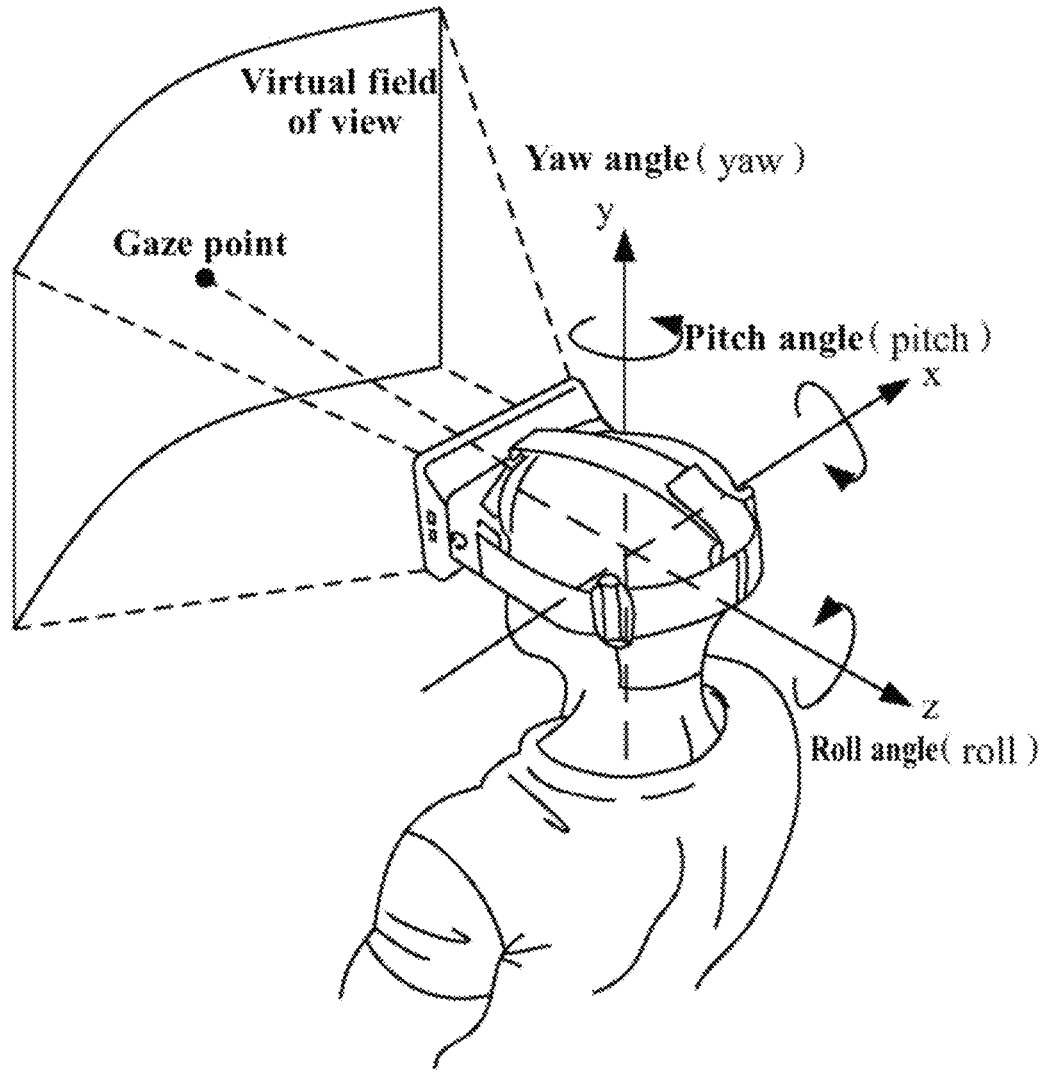
FIG. 2 is a schematic diagram of an application scene of a head mount display provided by an embodiment of the present disclosure.

Head Mount displays are relatively lightweight, ergonomically comfortable, and provide high-resolution content with low latency. FIG. 2 is a schematic diagram of an application scene of a head mount display provided by an embodiment of the present disclosure. Referring to FIG. 2, a virtual reality device is provided with posture detection sensors (such as nine-axis sensors) for real-time detection of posture changes of the virtual reality device. If a user wears the virtual reality device, when the posture of the user's head changes, the real-time posture of the head will be transmitted to a processor to hereby calculate the gaze point of the user's line of sight in the virtual environment, and calculate the image in the 3D model of the virtual environment that is within the range of user's gaze (that is, the virtual field of view) according to the gaze point, and display it on the display screen, which makes the user feel as if he/she is in an immersive experience of watching in the real environment.

At present, when using an extended reality device, users often have the demand to input information, for example, the demand to input English words, Chinese characters, numbers, punctuation marks, etc. into the extended reality device. In view of this situation, how to meet the demand of inputting information by users is an urgent problem to be solved at present.

Figure 3:
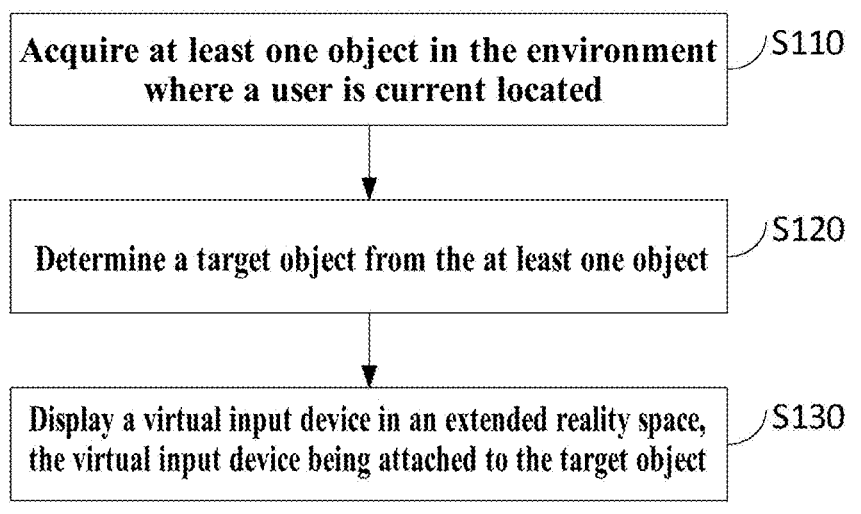
FIG. 3 is a flow chart of a display method for a virtual input device provided by an embodiment of the present disclosure.

In order to solve the above technical problem or at least partly solve the above technical problem, the present disclosure therefore provides a display method, apparatus, electronic device and storage medium for a virtual input device. FIG. 3 is a flow chart of a display method for a virtual input device provided by an embodiment of the present disclosure, and the method is applied to an extended reality XR terminal device. As shown in FIG. 3, the method may specifically comprise:

S110. Acquiring at least one object in the environment where a user is current located.

The essence of this step is to identify the objects in the environment where the user is current located, so as to acquire relevant information of various object included in the environment where the user is current located.

The relevant information of the object is features of the objects' own construction, composition, and position. Exemplarily, the relevant information of the object includes the name, style, size, color of the object, the position of the object in the environment, and the position of the object relative to the user, etc.

In this application, the user refers to the wearer of the extended reality device.

There are many specific implementation methods for this step, which are not limited in this application. Exemplarily, the implementation method for this step comprises: detecting depth information of each position in the environment where the user is located, and obtaining at least one object in the environment where the user is currently located based on detection result. The depth information refers to the distance of the position from the extended reality device.

In practice, the depth information may be a result directly collected by a device having depth information collecting function, or may be a preprocessed result obtained by preprocessing the result directly collected by a device having depth information collecting function. Wherein, collecting depth information of each position in the environment where the user is located can rely on one or more implementations of ToF (Time of Fly) ranging technology, millimeter wave ranging technology, acoustic wave ranging technology, and binocular camera ranging technology.

If the depth information is a preprocessed result obtained by preprocessing the result directly collected by a device having depth information collecting function, the preprocessing thereof specifically includes but not limited to filtering processing for noise reduction.

S120. Determining a target object from the at least one object.

The target object refers to an object used to simulate in the real world that can support an input device. Exemplarily, the target object may be a desktop or a wall.

There are many specific implementation methods for this step, which are not limited in this application. Exemplarily, a target object is determined from at least one object based on relevant information of the at least one object and/or user intention information.

The user intention information is information that can reflect user demands. The user intention information is obtained based on at least one of gesture information input by a user, voice information, operation information on a controller, and interaction records between a user and an extended reality device. In the scene where a target object is to be determined, the user intention information can assist in narrowing the determination range of the target object.

In some embodiments, a user emits the laser through a controller, so that the laser spot stays at a certain position, and at this time, the user intention information is to determine the object at the stay position of the laser spot as a target object. Alternatively, the user intention information is to use the stay position of the laser spot as a reference point, to determine an object within a second preset distance from the reference point as a target object. In this case, it is necessary to determine which objects are located less than the second preset distance from the reference point in combination with relevant information of the objects. If there is only one object whose distance from the reference point is less than the second preset distance, the object is determined as the target object. If there are multiple objects whose distance from the reference point is less than the second preset distance, it may be determined which object will be determined as the target object by further combining relevant information of these objects (such as whether including a plane, etc.).

In another embodiment, a user selects a certain object through a gesture, and at this time, the user intention information is to determine the object selected by the user through the gesture as a target object. Alternatively, the user draws the size of a virtual input device desired to be displayed through a gesture. At this time, the user intention information is to determine an object that can "place" the virtual input device with the size that the user wishes to display as a target object.

In another embodiment, the user expresses by voice that he/she wishes to take a certain object as a target object, and at this time, the user intention information is to determine the object selected by the user by voice as the target object. Alternatively, the user expresses by voice feature information that he/she desires to take as a target object, and at this time, the user intention information is to determine an object having the feature described by the user as the target object. Alternatively, the user expresses by voice feature information of an input device that he/she wishes to get, and at this time, the user intention information is to determine an object that can "place" a virtual input device with the feature described by the user as the target object.

S130. Displaying a virtual input device in an extended reality space, the virtual input device being attached to the target object.

The virtual input device includes but not limited to a virtual keyboard or a virtual keypad.

The virtual input device being attached to the target object means that, visually, a visual image of the virtual input device is placed on the target object.

The above technical solutions are arranged to acquire at least one object in the environment where a user is currently located; determine a target object from the at least one object; and display a virtual input device in an extended reality space, the virtual input device being attached to the target object. There is provided a virtual input device available for inputting information to meet the demand of inputting information by users. Moreover, since the displayed virtual input device is attached to the target object, it can improve the reality of a virtual world, make the virtual world as close as possible to the real world, and improve the "immersion" feeling of the users using the extended reality device.

In some embodiments, the distance between a target object and a user may be set to be less than a first preset distance. The target object includes a plane, and the virtual input device is attached to the plane of the target object. Since the virtual input device will be attached to the target object subsequently, the purpose of this setting is to ensure that the user can "touch" the virtual input device with as little or no movement as possible, and can input information with a more comfortable posture, thus can improve the convenience when the user inputs information.

In some embodiments, the first preset distance is the distance of the length of a user's arm, so that the user can "touch" the virtual input device to complete information input only by stretching the arm without moving, which can further improve the convenience when the user inputs information.

On the basis of the above technical solutions, in some embodiments, the method further comprises: determining target parameters of a virtual input device based on relevant information of at least one object and/or user intention information, so that parameters of the virtual input device displayed in an extended reality space are consistent with the target parameters.

The target parameters refer to parameters that determines the final display effect of the virtual input device. Exemplarily, the target parameters include at least one of: the displaying position coordinates of the virtual input device, the size of the virtual input device, the number of keys included in the virtual input device, the type of keys included in the virtual input device, and the arrangement of keys of the virtual input device.

The user intention information is information that can reflect user demands. The user intention information is obtained based on at least one of gesture information input by a user, voice information, operation information on a controller, and interaction records between a user and an extended reality device. In the scene where target parameters of a virtual input device are to be determined, the user intention information can assist in extending the reality device to clarify the user's demand, so as to display the virtual input device consistent with the user's demand.

In some embodiments, the user emits the laser through a controller, so that the laser draws a preset figure (such as a rectangle). Based on this, the obtained user intention information is that the geometric center of the virtual input device to be displayed coincides with the geometric center of the preset figure drawn by the laser spot, and the virtual input device is located within the drawn preset figure.

In another embodiment, the user draws the size of a virtual input device desired to be displayed through a gesture. Based on this, the obtained user intention information is that it is necessary to display a virtual input device with the size the user gestures.

In another embodiment, the user expresses parameters of a virtual input device desired to be displayed (such as a full keyboard) by voice, and based on this, the obtained user intention information is to display a virtual keyboard in the form of a full keyboard.

In another embodiment, interaction records between a user and an extended reality device indicate that the user will next enter numbers (such as entering a password, a verification code or a mobile phone number), and based on this, the obtained user intention information is to display a virtual keyboard in digital form. Here, the virtual keyboard in digital form refers to a virtual keyboard including Arabic numeral keys, excluding English letter keys, and excluding emoticon keys.

It should be noted that the present application has no limitations on execution sequence of the step "determining a target object from the at least one object based on relevant information of the at least one object and/or user intention information" and the step "determining target parameters of the virtual input device based on relevant information of the at least one object and/or user intention information". In other words, the two steps can be executed synchronously;

or they can also be executed sequentially. That is, the target parameters of the virtual input device can be determined first, and then the target object for "placing" the virtual input device can be determined. It is also possible to firstly determine the target object for "placing" the virtual input device, and then determine the target parameters of the virtual input device.

If the target parameters of the virtual input device are determined first, and then the target object for "placing" the virtual input device is determined, the target parameters of the virtual input device can be included in consideration factors for determining the target object as an influencing quantity, and can be considered together. If the target object for "placing" the virtual input device is determined first, and then the target parameters of the virtual input device are determined, properties (such as size, etc.) of the target object can be included in consideration factors for determining the target parameters of the virtual input device as an influencing quantity, and can be considered together.

On the basis of the above technical solutions, in some embodiments, after displaying the virtual input device in the extended reality space, the method further comprises: in response to an instruction that a key is selected in the virtual input device, displaying information for prompting that the key is selected.

When the user performs a trigger operation on a key in the virtual input device, two instructions are generated in total, one is an instruction that the key is selected, and the other is an instruction that the key is triggered. The instruction that the key is selected is generated before the instruction that the key is triggered.

In some embodiments, in response to an instruction that a key is selected in a virtual input device, information for prompting that the key is selected is displayed, and the information is used to indicate that in the current situation, if it is to continue to complete the specified trigger operation (for example, complete the action such as clicking or double-clicking, or say the name of the triggering action), the key will be triggered. In response to an instruction that a key is activated, a logic program corresponding to the triggered key is executed. Therefore, by displaying the information that the key is selected, it can help the user to know whether the key currently selected by the user is the key he/she wants to trigger, thereby reducing the probability of accidental touches.

In some embodiments, in response to an instruction that a key is selected in a virtual input device, displaying information for prompting that the key is selected comprises: in response to the instruction that the key is selected in the virtual input device, changing at least one of the background color, the outline color, and the size of the key. Such setting can facilitate the user to intuitively determine which key is currently selected, and further reach the purpose of reducing accidental touches.

In some embodiments, in practice, if the distance between a controller held by a user and a certain key is less than a set distance, an instruction that the key is selected is generated. Alternatively, if the distance between the ray formed by a controller held by a user and a certain key is less than a set distance, an instruction that the key is selected is generated. Alternatively, if the distance between a user's hand (such as a finger) and a certain key is less than a set distance, an instruction that the key is selected is generated. Alternatively, if the distance between the gaze point of a user and a certain key is less than a set distance, an instruction that the key is selected is generated. Alternatively, when a user speaks out identification information of a certain key by voice, but does not speak out the name of a triggering action, an instruction that the key is selected is generated.

On the basis of the above technical solutions, in some embodiments, a closing mechanism for the virtual input device may be set. In practice, there are many closing mechanisms for the virtual input device that can be set, which are not limited in this application.

In some embodiments, it can also be set that if no operation on a virtual input device is detected within a preset time period, the virtual input device will be closed. Since no operation on the virtual input device is detected within a preset period of time, it means that the user does not need to use the virtual input device at present. In this case, closing the virtual input device can minimize the chance of accidental touches.

In another embodiment, it can also be set that if the number of virtual input devices included in an extended reality space is greater than or equal to two, the last displayed virtual input device will be kept and the rest virtual input devices will be closed.

Exemplarily, when a user needs to input information at the position A, a virtual input device A1 is controlled to be displayed, which is near position A, so that the user can input information at the position A. When the user moves from the position A to position B and needs to input information, a virtual input device B1 is controlled to be displayed, which is near the position B so that the user can input information at the position B. When the virtual input device B1 is shown, the virtual input device A1 is closed.

Since the last displayed virtual input device is generated according to the latest usage requirement of the user, and it can best meet the user's demand, keeping the last displayed virtual input device and closing the rest can avoid accidental touches and avoid having too many useless virtual input devices appear in the user's field of view.

In another embodiment, a close control may also be displayed in an extended reality space, which is used to close a virtual input device; when it is detected that a user performs a trigger operation on the close control, the virtual input device corresponding to the close control is closed.

Figure 4:
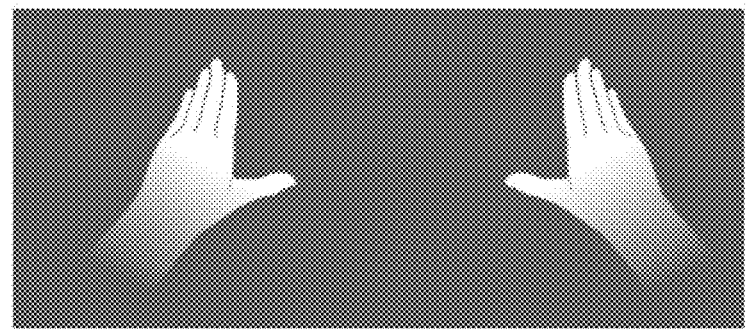
FIG. 4 is a schematic diagram of a gesture for controlling displaying a virtual input keyboard provided by an embodiment of the present disclosure.

FIG. 4 is a schematic diagram of a gesture for controlling displaying a virtual input keyboard provided by an embodiment of the present disclosure. Referring to FIG. 4, the gesture is that the arms are stretched out in front of the chest, the hands and four fingers are close together and straightened, and angles between the thumbs and the index fingers are greater than a preset angle (e.g., 30°). When it is detected that a user makes the gesture, at least one object in the environment where the user is current located is acquired; based on relevant information of the at least one object and/or user intention information, a target object and target parameters of a virtual input device are determined from the at least one object. Specifically, the user intention information is determined according to the distance between the user's hand and the extended reality device and the distance between the user's two hands when the user makes the gesture. Exemplarily, if the distance between the user's hand and the extended reality device is greater, an object farther away from the user is selected as the target object; if the distance between the user's hand and the extended reality device is closer, an object close to the user is selected as the target object. If the distance between the user's two hands is far away, the size of the virtual input device in the target parameter is larger; if the distance between the user's two hands is short, the size of the virtual input device in the target parameter is smaller. The virtual input device is displayed in the extended reality space, the virtual input device is attached to the target object, and parameters of the displayed virtual input device are consistent with the target parameters.

It should be noted that, for the foregoing method embodiments, for the sake of simple description, they are expressed as a series of action combinations, but those skilled in the art should know that the present disclosure is not limited by the order of the actions as described. As, according to the present disclosure, certain steps may be performed in other orders or concurrently. Secondly, those skilled in the art should also know that the embodiments described in the specification belong to preferred embodiments, and the actions and modules involved are not necessarily required by the present disclosure.

Figure 5:
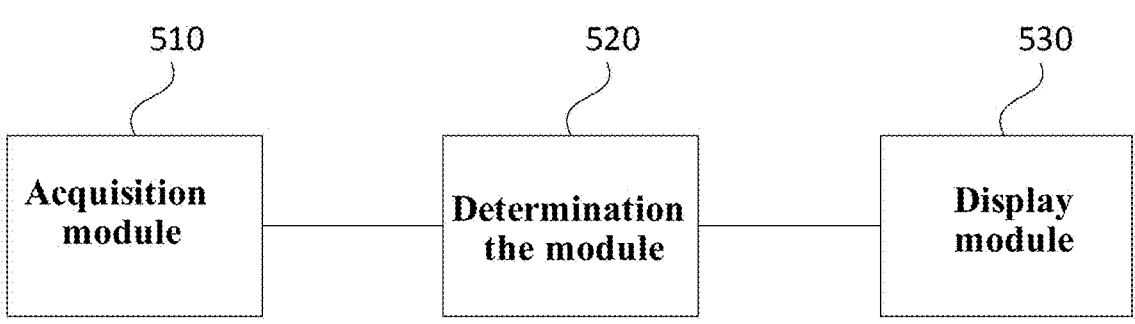
FIG. 5 is a schematic structural diagram of a display apparatus for a virtual input device in an embodiment of the present disclosure.

In sum, the technical solutions provided by embodiments of the present disclosure have following advantages compared with the related art:

The technical solutions provided by embodiments of the present disclosure are arranged to acquire at least one object in the environment where a user is currently located; determine a target object from the at least one object; and display a virtual input device in an extended reality space, the virtual input device being attached to the target object. There is provided a virtual input device available for inputting information to meet the demand of inputting information by users. Moreover, since the displayed virtual input device is attached to the target object, it can improve the reality of a virtual world, make the virtual world as close as possible to the real world, and improve the "immersion" feeling of the users using the extended reality device.p FIG. 5 is a schematic structural diagram of a display apparatus for a virtual input device in an embodiment of the present disclosure. The display apparatus for the virtual input device provided by the embodiment of the present disclosure is suitable for an extended reality device. Referring to FIG. 5, the display apparatus for the virtual input device specifically comprises:

an acquisition module 510 configured to acquire at least one object in the environment where the user is current located;

a determination module 520 configured to determine a target object from the at least one object;

a display module 530 configured to display a virtual input device in an extended reality space, the extended reality space being attached to the target object.

Further, the determination module is configured to:

determine a target object from the at least one object based on relevant information of the at least one object and/or user intention information; the user intention information being obtained based on at least one of gesture information input by a user, voice information, operation information on a controller, and interaction records between a user and an extended reality device.

Further, the distance between the target object and the user is less than a first preset distance. The target object includes a plane, and the virtual input device is attached to the plane of the target object.

Further, the determination module is configured to:

determine target parameters of the virtual input device based on relevant information of the at least one object and/or user intention information, so that parameters of the virtual input device displayed in the extended reality space are consistent with the target parameters; the user intention information being obtained based on at least one of gesture information input by a user, voice information, operation information on a controller, and interaction records between a user and an extended reality device.

Further, the target parameters include at least one of: the displaying position coordinates of the virtual input device, the size of the virtual input device, the number of keys included in the virtual input device, the type of keys included in the virtual input device, and the arrangement of keys of the virtual input device.

Further, the display module is further configured to:

display information for prompting that a key is selected in response to an instruction that the key is selected in the virtual input device.

Further, the display module is further configured to:

change at least one of the background color, the outline color and size of a key in response to an instruction that the key is selected in the virtual input device.

Further, the apparatus further comprises a closing module configured to:

close the virtual input device if no operation on the virtual input device is detected within a preset time period.

Further, the apparatus further comprises a closing module configured to:

if the number of virtual input devices included in an extended reality space is greater than or equal to two, keep the last displayed virtual input device, and close the rest of the virtual input devices.

The display apparatus for the virtual input device provided by the embodiment of the present disclosure can execute the steps in the display method for the virtual input device provided by the method embodiment of the present disclosure, and has execution steps and beneficial effects, which will not be repeated here.

Figure 6:
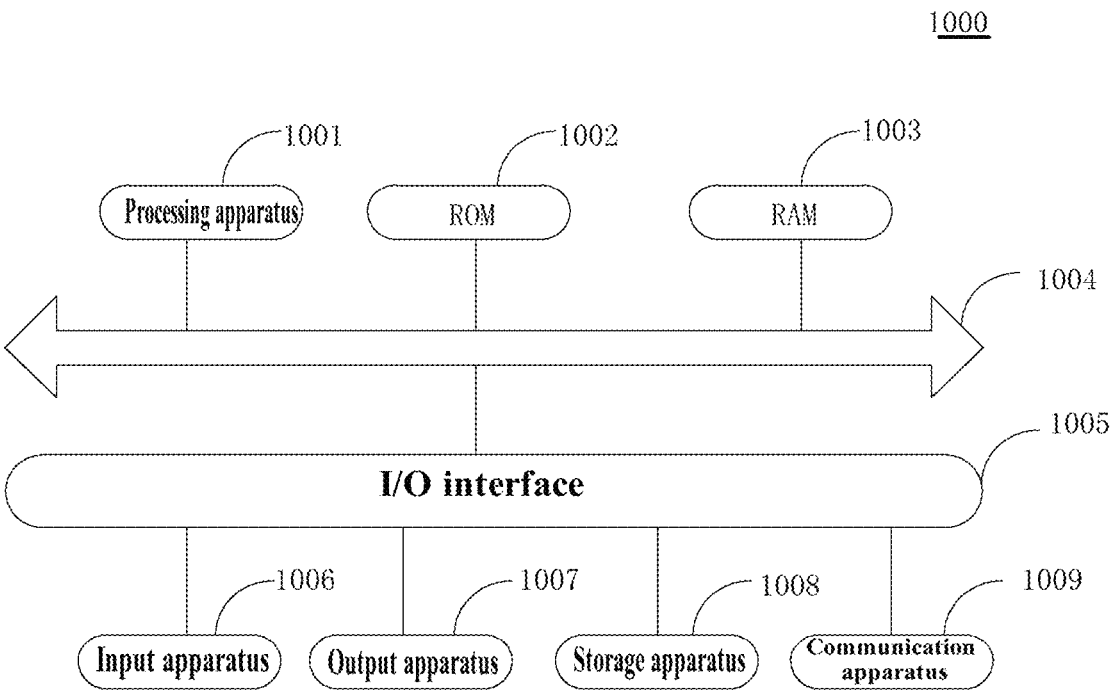
FIG. 6 is a schematic structural diagram of an electronic device in an embodiment of the present disclosure.

FIG. 6 is a schematic structural diagram of an electronic device in an embodiment of the present disclosure. Referring specifically to FIG. 6 below, it shows a schematic structural diagram suitable for implementing an electronic device 1000 in an embodiment of the present disclosure. The electronic device 1000 in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), a wearable electronic device, etc. and a fixed terminal such as a digital TV, a desktop computer, a smart home device, etc. The electronic device shown in FIG. 6 is only one example, and should not bring any limitation to functions and usage scopes of the embodiments of the present disclosure.

As shown in FIG. 6, the electronic device 1000 may include a processing apparatus (for example, a central processing unit, a graphics processing unit, etc.) 1001, which can execute various appropriate actions and processes according to a program stored in a read-only memory (ROM) 1002 or a program loaded from a storage apparatus 1008 into a random-access memory (RAM) 1003 to realize the display method for the virtual input device according to the embodiment of the present disclosure. In the RAM 1003, various programs and information necessary for the operation of the electronic device 1000 are also stored. The processing apparatus 1001, ROM 1002, and RAM 1003 are connected to each other through a bus 1004. An input/output (I/O) interface 1005 is also connected to the bus 1004.

Generally, the following apparatus can be connected to the I/O interface 1005: an input device 1006 including, for example, a touch screen, a touchpad, a keyboard, a mouse, a camera, a microphone, an accelerometer, a gyroscope, etc.; an output apparatus 1007 including, for example, a liquid crystal display (LCD), a speaker, a vibrator, etc.; a storage apparatus 1008 including, for example, a magnetic tape, a hard disk, etc.; and a communication apparatus 1009. The communication apparatus 1009 may allow the electronic device 1000 to perform wireless or wired communication with other devices to exchange information. Although FIG. 6 shows an electronic device 1000 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart, thereby realizing the display method for the virtual input device as described above. In such an embodiment, the computer program may be downloaded and installed from a network via the communication apparatus 1009, or installed from the storage apparatus 1008, or installed from the ROM 1002. When the computer program is executed by the processing apparatus 1001, the above functions defined in the methods of the embodiments of the present disclosure are executed.

It should be noted that the above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a information signal propagated in a baseband or as a part of a carrier wave, in which a computer-readable program code is carried. This propagated information signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some implementations, the client and the server can communicate using any known or future developed network protocols such as HTTP (HyperText Transfer Protocol), and can interconnect with digital information communication (for example, communication network) in any form or medium. Examples of communication networks include local area networks ("LAN"), wide area networks ("WAN"), international network (for example, the Internet), and end-to-end networks (for example, ad hoc end-to-end networks), as well as any known or future developed networks.

The above computer-readable medium may be included in above electronic devices; or it may exist alone without being assembled into the electronic device.

The above computer-readable medium carries one or more programs, which, when executed by the electronic device, cause the electronic device to:

acquire at least one object in the environment where a user is currently located;

determine a target object from the at least one object;

display a virtual input device in an extended reality space, the virtual input device being attached to the target object.

In some embodiments, when the above one or more programs are executed by the electronic device, the electronic device may also perform other steps described in the above embodiments.

The computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware. Wherein, the name of the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, the present disclosure provides an electronic device, comprising:

one or more processors;

a memory for storing one or more programs;

when executed by the one or more processors, the one or more programs cause the one or more processors to implement any one of the display methods for the virtual input device provided in the present disclosure.

According to one or more embodiments of the present disclosure, the present disclosure provides a computer-readable storage medium having a computer program stored thereon, which, when executed by a processor, implement any one the display methods for the virtual input device provided by the present disclosure.

An embodiment of the present disclosure further provides a computer program product including a computer program or an instruction, which, when executed by a processor, implement the display methods for the virtual input device as described above.

It should be noted that, here, relative terms such as "first" and "second" are only used to distinguish one entity or operation from another entity or operation, and do not necessarily require or imply any such actual relationship or order between these entities or operations. Furthermore, the term "comprises", "includes" or any other variation thereof is intended to cover a non-exclusive inclusion such that a process, method, article or device comprising a series of elements includes not only those elements, but also includes elements not expressly listed, or elements inherent in such process, method, article, or device. Without further limitations, an element defined by the phrase "comprising one . . . " does not exclude the presence of additional identical elements in the process, method, article or apparatus comprising said element.

The above descriptions are only specific implementation of the present disclosure, so that those skilled in the art can understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments described herein, but is to be accorded the widest scope consistent with the principles and novel features disclosed herein.

What is claimed is:

1. A display method for a virtual input device suitable for an extended reality device, comprising:

acquiring at least one object in an environment where a user is currently located;

determining a target object from the at least one object;

displaying a virtual input device in an extended reality space, the virtual input device being attached to the target object, wherein a distance between the target object and the user is less than a first distance, the target object comprises a plane, and the virtual input device is attached to the plane of the target object; and in response to a number of virtual input devices comprised in the extended reality space being greater than or equal to two, keeping the last displayed virtual input device, and closing the rest of the virtual input devices.

2. The method according to claim 1, wherein determining the target object from the at least one object comprises:

determining the target object from the at least one object based on at least one of relevant information of the at least one object or user intention information; the user intention information being obtained based on at least one of gesture information, voice information, operation information on a controller, which are input by the user, or an interaction record between the user and the extended reality device.

3. The method according to claim 1, further comprising:

determining a target parameter of the virtual input device based at least one of relevant information of the at least one object or user intention information, so that a parameter of the virtual input device displayed in the extended reality space is consistent with the target parameter; the user intention information being obtained based on at least one of gesture information, voice information, operation information on a controller, which are input by the user, or an interaction record between the user and the extended reality device.

4. The method according to claim 3, wherein the target parameter comprises at least one of: displaying position coordinates of the virtual input device, a size of the virtual input device, a number of keys comprised in the virtual input device, a type of keys comprised in the virtual input device, or an arrangement of keys of the virtual input device.

5. The method according to claim 1, further comprising:

displaying information for prompting that a key is selected in response to an instruction that the key is selected in the virtual input device.

6. The method according to claim 5, wherein displaying the information for prompting that the key is selected in response to the instruction that the key is selected in the virtual input device comprises:

changing at least one of a background color, an outline color, or a size of the key in response to the instruction that the key is selected in the virtual input device.

7. The method according to claim 1, further comprising:

closing the virtual input device in response to no operation on the virtual input device being detected within a preset time period.

8. An electronic device, comprises:
one or more processors; and
a storage for storing one or more programs;
wherein the one or more programs, when executed by the one or more processors, cause the one or more processors to implement following display operations for a virtual input device:
acquiring at least one object in an environment where a user is currently located;
determining a target object from the at least one object;
displaying a virtual input device in an extended reality space, the virtual input device being attached to the target object,
wherein a distance between the target object and the user is less than a first distance, the target object comprises a plane, and the virtual input device is attached to the plane of the target object; and
in response to a number of virtual input devices comprised in the extended reality space being greater than or equal to two, keeping the last displayed virtual input device, and closing the rest of the virtual input devices.

9. The electronic device according to claim 8, wherein determining the target object from the at least one object comprises:
determining the target object from the at least one object based on at least one of relevant information of the at least one object or user intention information; the user intention information being obtained based on at least one of gesture information, voice information, operation information on a controller, which are input by the user, or an interaction record between the user and the extended reality device.

10. The electronic device according to claim 8, wherein the one or more programs, when executed by the one or more processors, cause the one or more processors to further implement a following operation:
determining a target parameter of the virtual input device based at least one of relevant information of the at least one object or user intention information, so that a parameter of the virtual input device displayed in the extended reality space is consistent with the target parameter; the user intention information being obtained based on at least one of gesture information, voice information, operation information on a controller, which are input by the user, or an interaction record between the user and the extended reality device.

11. The electronic device according to claim 10, wherein the target parameter comprises at least one of: displaying position coordinates of the virtual input device, a size of the virtual input device, a number of keys comprised in the virtual input device, a type of keys comprised in the virtual input device, or an arrangement of keys of the virtual input device.

12. The electronic device according to claim 8, wherein the one or more programs, when executed by the one or more processors, cause the one or more processors to further implement a following operation:
displaying information for prompting that a key is selected in response to an instruction that the key is selected in the virtual input device.

13. The electronic device according to claim 12, wherein displaying the information for prompting that the key is selected in response to the instruction that the key is selected in the virtual input device comprises:
changing at least one of a background color, an outline color, or a size of the key in response to the instruction that the key is selected in the virtual input device.

14. A non-transitory computer-readable storage medium having a computer program stored thereon, wherein the computer program, when executed by a processor, implements following display operations for a virtual input device:
acquiring at least one object in an environment where a user is currently located;
determining a target object from the at least one object;
displaying a virtual input device in an extended reality space, the virtual input device being attached to the target object,
wherein a distance between the target object and the user is less than a first distance, the target object comprises a plane, and the virtual input device is attached to the plane of the target object; and
in response to a number of virtual input devices comprised in the extended reality space being greater than or equal to two, keeping the last displayed virtual input device, and closing the rest of the virtual input devices.

15. The non-transitory computer-readable storage medium according to claim 14, wherein determining the target object from the at least one object comprises:
determining the target object from the at least one object based on at least one of relevant information of the at least one object or user intention information; the user intention information being obtained based on at least one of gesture information, voice information, operation information on a controller, which are input by the user, or an interaction record between the user and the extended reality device.

16. The non-transitory computer-readable storage medium according to claim 14, wherein the computer program, when executed by the processor, further implements a following operation:
determining a target parameter of the virtual input device based at least one of relevant information of the at least one object or user intention information, so that a parameter of the virtual input device displayed in the extended reality space is consistent with the target parameter; the user intention information being obtained based on at least one of gesture information, voice information, operation information on a controller, which are input by the user, or an interaction record between the user and the extended reality device.

17. The non-transitory computer-readable storage medium according to claim 16, wherein the target parameter comprises at least one of: displaying position coordinates of the virtual input device, a size of the virtual input device, a number of keys comprised in the virtual input device, a type of keys comprised in the virtual input device, or an arrangement of keys of the virtual input device.

18. The non-transitory computer-readable storage medium according to claim 14, wherein the computer program, when executed by the processor, further implements a following operation:
displaying information for prompting that a key is selected in response to an instruction that the key is selected in the virtual input device.

19. The non-transitory computer-readable storage medium according to claim 18, wherein displaying the information for prompting that the key is selected in response to the instruction that the key is selected in the virtual input device comprises:
changing at least one of a background color, an outline color, or a size of the key in response to the instruction that the key is selected in the virtual input device.

* * * * *